(12) United States Patent
Izumi

(10) Patent No.: US 7,086,295 B2
(45) Date of Patent: Aug. 8, 2006

(54) TORQUE DETECTING APPARATUS

(75) Inventor: Takeshi Izumi, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/765,980

(22) Filed: Jan. 29, 2004

(65) Prior Publication Data
US 2004/0182178 A1 Sep. 23, 2004

(30) Foreign Application Priority Data
Jan. 31, 2003 (JP) ............... 2003-024892

(51) Int. Cl.
G01L 3/02 (2006.01)
G01L 3/10 (2006.01)
G01L 3/12 (2006.01)
G01L 3/14 (2006.01)

(52) U.S. Cl. ............................. 73/862.325
(58) Field of Classification Search ............. 180/444, 180/446; 73/862.322, 862.331; 324/546
See application file for complete search history.

(56) References Cited
U.S. PATENT DOCUMENTS
5,573,079 A * 11/1996 Suda et al. ............. 180/444
6,328,128 B1 12/2001 Chikaraishi
6,426,690 B1 * 7/2002 Takenoshita et al. ....... 335/220
6,731,194 B1 * 5/2004 Abe ........................ 338/167

FOREIGN PATENT DOCUMENTS
| EP | 0 481 568 A1 | 4/1992 |
| GB | 863679 | 3/1961 |
| JP | 1-244322 | 9/1989 |
| JP | 01-244322 B2 | 3/1995 |
| JP | 07-21433 B2 | 3/1995 |
| WO | WO 98/26972 | 6/1998 |

* cited by examiner

Primary Examiner—Max Noori
Assistant Examiner—Octavia Davis
(74) Attorney, Agent, or Firm—Birch, Stewart, Kolasch & Birch, LLP

(57) ABSTRACT

A sensor coil 10 serving as a sensor unit fitted and retained in a sensor retaining hole 32 of a sensor housing 3 and a circuit board 5 stored in a board chamber 30 provided inside the sensor housing 3 are integrated by coating the outer surface of a lead 13 and the circuit board 5 with a resin layer 17 formed by resin molding performed under the condition in which the sensor coil 10 and the circuit board 5 are connected with the lead 13. As a result, mounting of the sensor unit and the circuit board of a torque detecting apparatus in the housing is facilitated, the reliability of the connection part of the sensor unit and the circuit board is increased, and occurrence of connection defects due to the function of external force is prevented.

9 Claims, 3 Drawing Sheets

TORQUE DETECTING APPARATUS

This Non-provisional application claims priority under 35 U.S.C. § 119(a) on Patent Application No(s). 2003-024892 filed in Japan on Jan. 31, 2003, the entire contents of which are hereby incorporated by reference.

BACKGROUND OF THE INVENTION

1. Field of the Invention

The present invention relates to a torque detecting apparatus used to detect a rotational torque applied to a steering member for steering in, for example, an electric power steering apparatus.

2. Description of Related Art

In an electric power steering apparatus which assists steering by driving a steering assist motor according to the rotational operation of a steering member for steering (for example, a steering wheel) and transmitting the rotational force of the motor to a steering mechanism, it is necessary to detect a rotational torque applied to the steering member for use in drive and control of the steering assist motor. In order to detect the torque, a torque detecting apparatus constructed at the middle of a rotary shaft (column shaft) connecting the steering member and the steering mechanism has been conventionally used.

In the torque detecting apparatus, the column shaft to be detected is divided into a first shaft and a second shaft which are connected on the same axis through a torsion bar with a small diameter. When the steering member for steering is rotationally operated, relative angular displacement occurs between the first and second shafts with a twist of the torsion bar caused by the function of the rotational torque. The torque detecting apparatus is constructed to detect the rotational torque by this relative angular displacement.

The detection of relative angular displacement is realized by, for example, a structure in which detection rings are externally fitted and fixed near the connected section of the first and second shafts, a sensor coil (sensor unit) is fitted and retained in a cylindrical housing supporting the column shaft so as to surround the facing section of the detection rings, a magnetic circuit passing through the facing section of the detection rings is formed by distribution of electric current to the sensor coil, and a change in the facing relationship between the respective detection rings corresponding to the relative angular displacement between the first and second shafts caused by the function of the rotational torque is fetched as an impedance change in the sensor coil due to an increase/decrease in the magnetic resistance of the magnetic circuit, through a circuit board mounted in a board chamber provided inside the housing (see, for example, Japanese Patent Application Publication No. 7-21433 (1995)).

The board chamber in which the circuit board is mounted is connected through a lead aperture to a sensor retaining hole formed to retain the sensor coil in the housing, and the sensor coil and the circuit board are connected through a connection lead which is extended from the sensor coil, passed through the lead aperture and guided into the board chamber.

The mounting of the torque detecting apparatus constructed as described above is realized by a procedure in which the sensor coil as the sensor unit is fitted into the sensor retaining hole, and fixed and retained in a predetermined position, the circuit board is mounted in the board chamber outside the housing, and the circuit board and the sensor coil are connected through the connection lead passed through the lead aperture as mentioned above.

In such a mounting procedure, however, the fitting of the sensor coil into the sensor retaining hole through an opening on one side in the axial direction and the mounting of the circuit board in the board chamber from outside in a radial direction of the housing are the operations of separate processes. Moreover, during these operations, it is necessary to connect the connection lead passed through the lead aperture to the circuit board. Thus, such a mounting procedure has the problem of requiring a number of mounting processes.

Further, since the torque detecting apparatus mounted as described above is used under severe condition in which external force such as vibration caused by driving of a vehicle is always applied, there is a possibility that connection defects may occur with the passage of time in the connection part of the circuit board and the sensor coil due to the function of the external force. In this case, there arise troubles in fetching the output of the sensor coil, and it becomes impossible to perform normal torque detection.

The torque detecting apparatus used for detecting a rotational torque applied to the steering member of an electric power steering apparatus is not limited to the above-mentioned structure comprising the detection rings externally fitted and fixed on the column shaft and the sensor coil fitted and retained in the sensor retaining hole of the housing, and has been applied to practical applications in various structures. However, in any of the structures, the sensor unit retained in the sensor retaining hole of the housing is connected to the circuit board mounted in the board chamber isolated from the sensor retaining hole to fetch the output of the sensor unit through the circuit board, and therefore it is very important to facilitate the mounting of the sensor unit and the circuit board in the housing, to increase the reliability of the connection part of the sensor unit and the circuit board, and to prevent occurrence of connection defects due to the function of external force such as vibration.

BRIEF SUMMARY OF THE INVENTION

The present invention has been made with the aim of solving the above problems, and it is an object thereof to provide a torque detecting apparatus capable of performing highly accurate torque detection over a long time by facilitating the mounting of the sensor unit and the circuit board of the torque detecting apparatus in a housing, increasing the reliability of the connection part of the sensor unit and the circuit board, and preventing occurrence of connection defects due to the function of external force, such as vibration, applied during use.

A torque detecting apparatus according to the present invention is a torque detecting apparatus constructed by connecting a sensor unit retained in a housing supporting a rotary shaft to a circuit board mounted inside the housing, for fetching the output of the sensor unit corresponding to rotational torque applied to the rotary shaft through the circuit board, characterized in that the circuit board is integrated with the sensor unit by resin molding performed under a condition in which the circuit board and the sensor unit are connected.

In the present invention, the sensor unit and the circuit board are connected through a lead, and integrated by performing resin molding under this connected state. As a result, it is possible to prevent occurrence of connection defects due to the function of external force, such as vibration, and to enable highly accurate torque detection over a long time. The circuit board integrated with the sensor unit in this manner is supported by using the sensor unit retained in the housing as a support body through the lead reinforced by resin molding. Accordingly, there is no need to mount the circuit board in the board chamber and to perform positioning which is necessary for the mounting, and the number of mounting processes can be reduced. In addition, by performing the integration of the circuit board and the sensor unit by resin molding before mounting them in the housing and then mounting the integrated circuit board and sensor unit collectively in the housing, it is possible to achieve a further reduction in the number of mounting steps.

The above and further objects and features of the invention will more fully be apparent from the following detailed description with accompanying drawings.

DETAILED DESCRIPTION OF THE INVENTION

Figure 1:
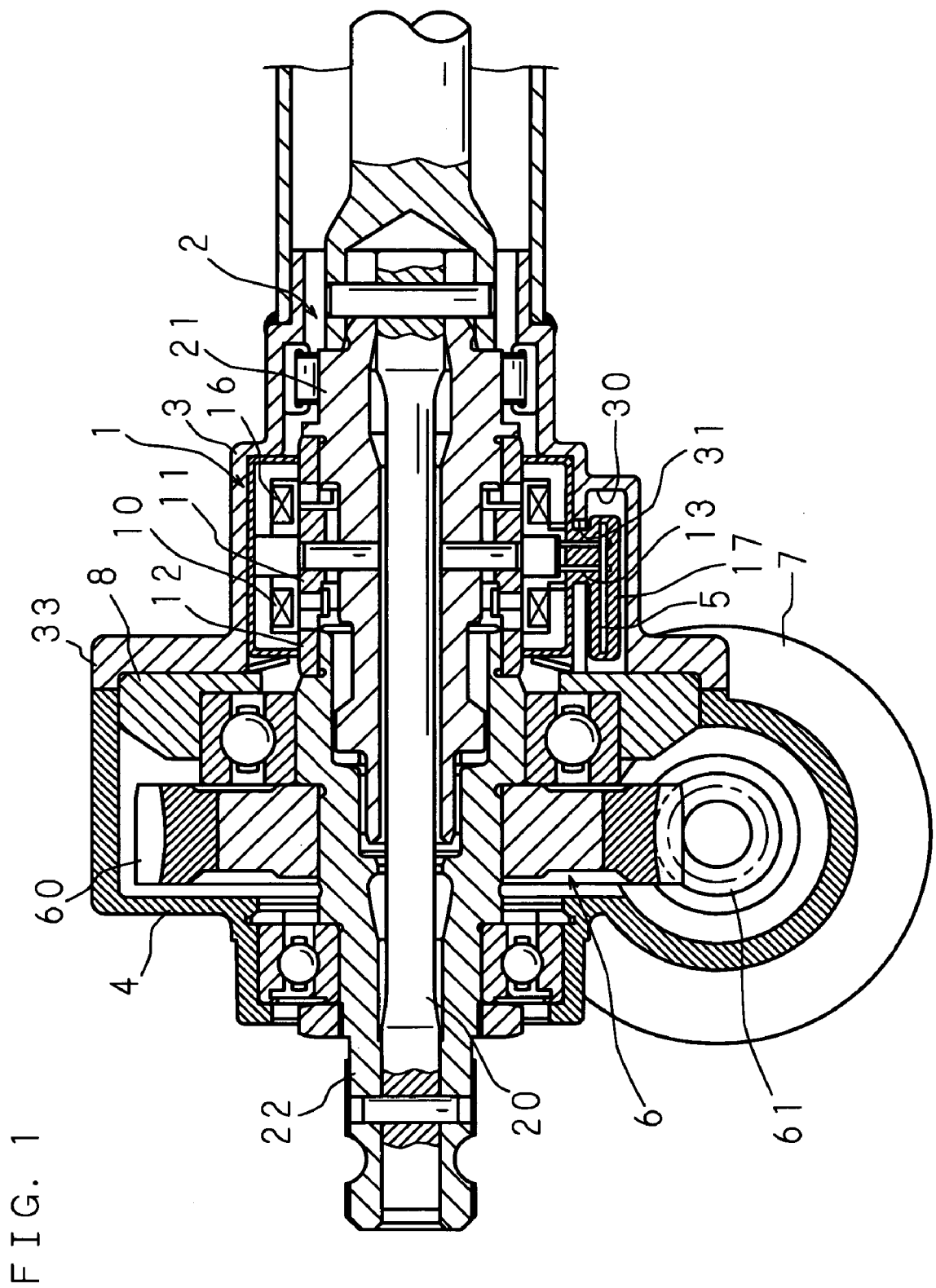
FIG. 1 is a vertical sectional view showing the structure of a torque detecting apparatus according to the present invention.

The following description will explain the present invention in detail based on the drawings illustrating an embodiment thereof. FIG. 1 is a vertical sectional view showing the structure of a torque detecting apparatus according to the present invention. This figure illustrates an example of application to an electric power steering apparatus. A torque detecting apparatus 1 is constructed to detect a rotational torque applied to a column shaft (rotary shaft) 2 supported rotatably in a cylindrical sensor housing 3.

The column shaft 2 is divided into a first shaft 21 and a second shaft 22 which are connected on the same axis through a torsion bar 20 with a small diameter. An end of the first shaft 21 protruding from one side of the sensor housing 3 is connected to a steering member (not shown). An end of the second shaft 22 protrudes from one side of a transmission housing 4, the other side of which is connected to the same side of the sensor housing 3, and is connected to a steering mechanism (not shown).

With the above-described structure, the first shaft 21 and the second shaft 22 can be rotated as a unit by the function of rotational torque applied to the column shaft 2 when the steering member is rotationally operated. Consequently, the rotational operation of the steering member for steering is transmitted to the steering mechanism, and steering is performed by the operation of the steering mechanism. At this time, the torsion bar 20 connecting the first and second shafts 21 and 22 is twisted by the function of the rotational torque, and relative angular displacement occurs between the first shaft 21 and the second shaft 22 according to the twist of the torsion bar 20. Since the direction and magnitude of the relative angular displacement correspond to the direction and magnitude of the rotational torque, it is possible to detect the rotational torque applied to the steering member by this relative angular displacement between the two shafts 21 and 22.

Cylindrical detection rings 11 and 12 are externally fitted and fixed near the connected section of the first shaft 21 and the second shaft 22. On each of the facing end faces of these detection rings 11 and 12 facing each other with a substantially uniform air gap therebetween, a plurality of tooth parts are aligned in a circumferential direction so that half parts thereof face each other. A sensor coil (sensor unit) 10 fitted and retained in the sensor housing 3 is disposed outside the detection rings 11 and 12 to surround the facing section of the detection rings 11 and 12. Such detection rings 11 and 12 and the sensor coil 10 constitute the torque detecting apparatus 1.

In this torque detecting apparatus 1, a magnetic circuit passing through the tooth parts formed on the facing end faces of the detection rings 11 and 12 is formed by distribution of electric current to the sensor coil 10, and relative angular displacement between the first shaft 21 and the second shaft 22 caused by the function of rotational torque is detected by using an increase/decrease in the magnetic resistance of the magnetic circuit caused according to a change in the facing relationship between the tooth parts of the detection rings 11 and 12 that rotate together with the first shaft 21 and the second shaft 22. In short, an impedance change in the sensor coil 10 is fetched as an output.

Inside the sensor housing 3, a board chamber 30 is formed integrally to match the retaining position of the sensor coil 10. A circuit board 5 on which a power supply circuit and an output processing circuit are formed is stored in the board chamber 30. The sensor coil 10 has a connection lead (connection part) 13 protruding outward in the circumferential direction. The sensor coil 10 and the circuit board 5 are connected through the lead 13 passed through a lead aperture 31 formed in the circumferential wall of the sensor housing 3, and the supply of electric current to the sensor coil 10 and fetching of the impedance of the sensor coil 10 are performed through the circuit board 5.

In the transmission housing 4 connected to the sensor housing 3, there is constructed a worm-gear transmission apparatus 6 comprising a worm wheel 60 externally fitted and fixed to the middle of the second shaft 22, and a worm 61 meshing with the tooth part on the outer circumference of the worm wheel 60 from a tangent direction. A steering assist motor 7 is attached to the outer circumference of the transmission housing 4. The output shaft of the motor 7 extending into the transmission housing 4 is coaxially connected to one end of the worm 6.

The steering assist motor 7 is driven and controlled based on the detection result of steering torque given by the torque detecting apparatus 1 constructed as described above. The rotation of the motor 7 driven in this manner is transmitted to the column shaft 2 (second shaft 22) through deceleration by the worm-gear transmission apparatus 6 comprising the worm 61 and the worm wheel 60, and the rotation of the column shaft 2 is transmitted to the steering mechanism, and thus steering performed by the operation of the steering mechanism is assisted.

Figure 2:
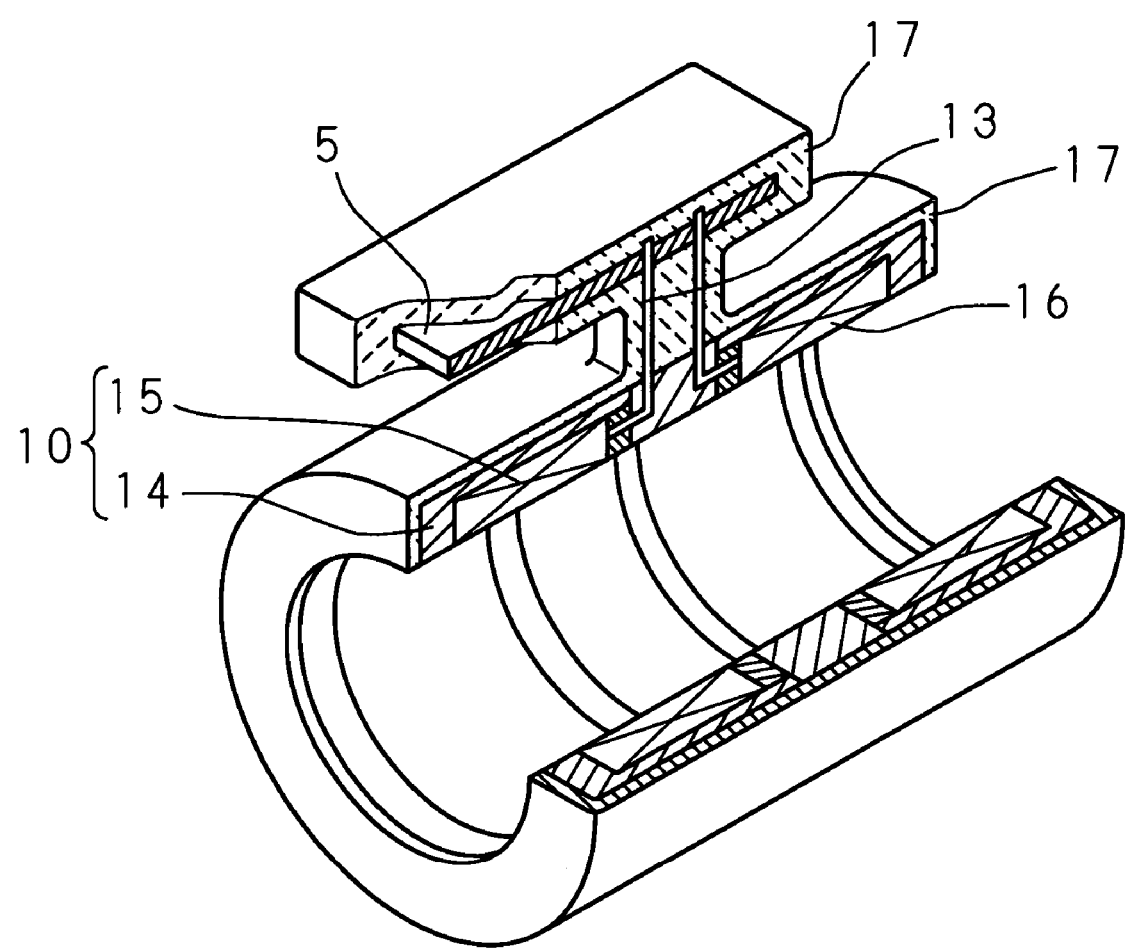
FIG. 2 is a partly broken perspective view showing schematically the connection structure of the sensor coil and the circuit board.

The characteristic feature of the torque detecting apparatus 1 of the present invention is the connection structure of the sensor coil 10 and the circuit board 5 mounted in the sensor housing 3. FIG. 2 is a partly broken perspective view showing schematically the connection structure of the sensor coil 10 and the circuit board 5.

As shown in FIG. 2, the sensor coil 10 comprises a ring-shaped yoke 14 made of a magnetic material and having a cross section in the shape of an inwardly open square bracket, and a winding 15 wound and retained in the recess of the yoke 14. The connection lead 13 extended from the winding 15 protrudes outward in a radial direction of the yoke 14. Note that a temperature compensation coil 16 having a similar structure is disposed on one side in the axial direction of the sensor coil 10, and a connection lead 13 from the temperature compensation coil 16 protrudes from a position near the lead 13 of the sensor coil 10.

The circuit board 5 is a printed-circuit board made of synthetic resin on which printed circuits for power supply and output processing are formed and necessary circuit parts are mounted. The connection leads 13 protruding from the sensor coil 10 and the temperature compensation coil 16 are passed through separate connection apertures formed through the circuit board 5, and connected to predetermined positions on the printed circuits by soldering from the front face of the circuit board 5.

In FIG. 2, two leads 13 protruding from the sensor coil 10 and the temperature compensation coil 16, respectively, are shown. However, actually, a plurality of leads 13 for power supply and for fetching the output protrude from each of the coils 10 and 16, and they are respectively connected to the circuit board 5. Beside, in FIG. 2, the circuit board 5 is illustrated as a simple flat plate, and illustration of the printed circuits and mounted parts is omitted.

The circuit board 5 connected as described above is supported outside of the sensor coil 10 in a position separated by a predetermined distance from the sensor coil 10 by using the connection leads 13 as support legs and the sensor coil 10 as a support body. Further, in the present invention, resin molding using synthetic resin such as, for example, PBT, PPS, PA6, PA66 and PA12, is performed for the circuit board 5 connected to the sensor coil 10 as described above, and both of the front and rear faces of the circuit board 5 and the outer surface of the connection leads 13 are coated with a resin layer 17 of a predetermined thickness. With this structure, the circuit board 5 is integrated with the sensor coil 10 and the temperature compensation coil 16, and supported using the leads 13 and the resin layer 17 coating the outer surface thereof as the support legs. Note that the resin layer 17 shown in FIG. 2 is formed so that the outer surface of the sensor coil 10 and the temperature compensation coil 16 is also coated with a predetermined thickness.

Such resin molding may be performed inside the sensor housing 3 after fitting and retaining the sensor coil 10 in the sensor retaining hole 32 of the sensor housing 3, mounting the circuit board 5 in the board chamber 30 in the sensor housing 3, and connecting the sensor coil 10 and the circuit board 5 with the lead 13. Alternatively, it may be possible to connect the circuit board 5 and the sensor coil 10 before mounting them in the sensor housing 3, integrate the sensor coil 10 and the circuit board 5 by the resin layer 17 formed by resin molding in advance, and mount them in this state in the sensor housing 3.

Figure 3:
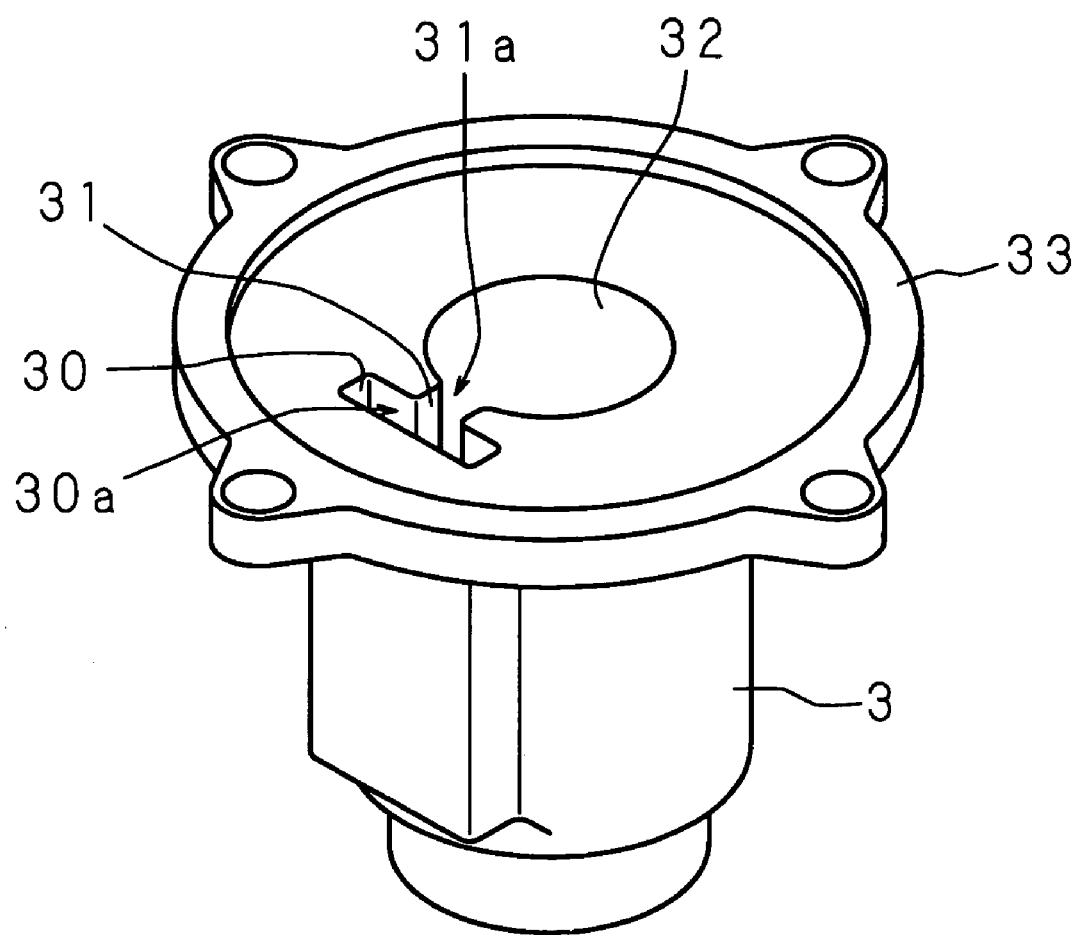
FIG. 3 is a perspective view showing a sensor housing constructed to enable mounting of the sensor coil and the circuit board which are integrated in advance.

FIG. 3 is a perspective view showing the sensor housing 3 constructed to enable mounting of the sensor coil 10 and the circuit board 5 which are integrated in advance. As shown in FIG. 3, the sensor housing 3 has a cylindrical shape with the sensor retaining hole 32 for retaining the sensor coil 10 in the axial center, and has a connection flange 33 for connection to the transmission housing 4, on one end in the axial direction thereof. Beside, the board chamber 30 in the shape of a rectangular box for storing the circuit board 5 is provided in one position on the outer circumferential surface of the sensor housing 3, and the board chamber 30 is connected to the sensor retaining hole 32 in the inside through the lead aperture 31 going through the circumferential wall. Here, the board chamber 30 and the lead aperture 31 are extended to the connection side to the transmission housing 4 over the entire width and connected to openings 30a and 31a, respectively, formed in the flange face of the connection flange 33 on the same side.

The sensor coil 10 and the circuit board 5 integrated as shown in FIG. 2 are mounted in the sensor housing 3 as shown in FIG. 1 by fitting the sensor coil 10 into the sensor retaining hole 32 and simultaneously inserting the circuit board 5 and the lead 13 coated with the resin layer 17 collectively into the board chamber 30 and the lead aperture 31 through the openings 30a and 31a formed in the flange face, and fixing the sensor coil 10 to a predetermined position in the sensor retaining hole 32.

Since the circuit board 5 mounted in the board chamber 30 in this manner uses the resin layer 17 made of synthetic resin coating the outer surface of the circuit board 5 and the lead 13 as the support leg and is supported elastically by the sensor coil 10 fitted and fixed in the sensor retaining hole 32, it is unnecessary to fix the circuit board 5 in the board chamber 30. The circuit board 5 supported in this manner can maintain a good connected state to the sensor coil 10 with the lead 13 even under the conditions where the torque detecting apparatus 1 is applied to an electric power steering apparatus and external force such as vibration caused by driving of a vehicle is always applied, thereby significantly reducing the possibility of troubles in torque detection due to connection defects with the passage of time.

Moreover, since the sensor coil 10 and the circuit board 5 integrated by the resin layer 17 can be easily mounted by the procedure of pushing them into the sensor housing 3 from one side in the axial direction, it is possible to enable a significant reduction in the number of mounting processes.

After the above-described mounting, as shown in FIG. 1, the openings 30a and 31a for the board chamber 30 and the lead aperture 31 going through the flange face of the connection flange 33 are closed by a spacer plate 8 interposed between the sensor housing 3 and the transmission housing 4 connected to the sensor housing 3 through the connection flange 33, so that the torque detecting apparatus 1 in the sensor housing 3 is isolated from the worm-gear transmission apparatus 6 in the transmission housing 4. Note that, as shown in FIG. 1, the spacer plate 8 also functions as a support body for a bearing which supports the middle of the second shaft 22.

The torque detecting apparatus 1 according to the present invention is not limited to the illustrated structure for fetching the relative angular displacement between the first and second shafts constituting the column shaft 2 as an impedance change in the sensor coil 10 serving as a sensor unit, and may be realized by other structures. Even when other structures are adopted, needless to say, it is possible to employ the above-described connection structure of the sensor unit and the circuit board and to obtain the same effects.

Although the torque detecting apparatus for use in an electric power steering apparatus is illustrated in the above-described embodiment, the present invention is also applicable to every torque detecting apparatus used for detecting the rotational torque applied to a rotary shaft in various industrial fields.

As described in detail above, in the torque detecting apparatus according to the present invention, since the sensor unit and the circuit board are integrated by resin molding, it is possible to reduce the number of mounting processes. Moreover, since the reliability of the connection part of the sensor unit and the circuit board is increased, it is possible to reduce the possibility of connection defects due to the function of external force, such as vibration, and to enable highly accurate torque detection over a long time.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A torque detecting apparatus comprising:
   a rotary shaft;
   a housing for supporting the rotary shaft;
   a sensor unit, retained in the housing, for producing an output corresponding to rotational torque applied to the rotary shaft;
   a circuit board, mounted in the housing, for supplying the output of the sensor unit to an external device; and
   a connection part for connecting the sensor unit and the circuit board,
   wherein the circuit board and the connection part are integrally coated with synthetic resin.

2. The torque detecting apparatus according to claim 1, wherein the sensor unit is coated with synthetic resin integrally with the circuit board and the connection part.

3. The torque detecting apparatus according to claim 2, wherein the synthetic resin includes at least one of PBT, PPS, PA6, PA66 and PA12.

4. The torque detecting apparatus according to claim 1, wherein the synthetic resin includes at least one of PBT, PPS, PA6, PA66 and PA12.

5. A torque detector comprising:
   a housing;
   a shaft rotatably supported in the housing;
   a sensor unit in the housing producing an output indicative of a rotational torque applied to the rotary shaft;
   a circuit board in the housing electrically connected to the senor by a connection part between the circuit board and the sensor, the circuit board supplying an output of the sensor unit to an external device; and
   a layer of synthetic resin integrally coating the circuit board and connection part.

6. The torque detector of claim 5 wherein said layer of synthetic resin integrally coats the circuit board, the connection part and the sensor.

7. The torque detector of claim 5, wherein the synthetic resin includes a material selected from the group consisting of PBT, PPS, PA6, PA66 and PA12.

8. The torque detector of claim 6, wherein the synthetic resin includes a material selected from the group consisting of PBT, PPS, PA6, PA66 and PA 12.

9. A torque detecting apparatus comprising:
   a rotary shaft;
   a housing for supporting the rotary shaft;
   a sensor unit, retained in the housing, for producing an output corresponding to rotational torque applied to the rotary shaft;
   a circuit board, mounted in the housing, for supplying the output of the sensor unit through a connection part for connecting the sensor unit and the circuit board to an external device; and
   wherein the sensor unit, the circuit board and the connection part are integrally coated with synthetic resin.

* * * * *